United States Patent [19]

Pfeffer

[11] 4,135,029
[45] Jan. 16, 1979

[54] FIBERGLASS MAT

[75] Inventor: John R. Pfeffer, Bakersfield, Calif.

[73] Assignee: Consolidated Fiberglass Products Co., Bakersfield, Calif.

[21] Appl. No.: 868,725

[22] Filed: Jan. 11, 1978

Related U.S. Application Data

[63] Continuation-in-part of Ser. No. 681,422, Apr. 29, 1976, abandoned.

[51] Int. Cl.² ............................................. B32B 17/00
[52] U.S. Cl. .................................. 428/284; 428/285; 428/288; 428/292; 428/294; 428/297; 428/298; 428/302; 428/426; 428/910; 428/920
[58] Field of Search ............... 428/282, 288, 292, 294, 428/295, 298, 302, 293, 285, 286, 289, 290, 297, 332, 375, 392, 426, 920, 910

[56] References Cited

U.S. PATENT DOCUMENTS

| 2,731,066 | 1/1956 | Hogendobler et al. | 428/293 |
| 2,904,453 | 9/1959 | Labino | 428/293 |
| 3,684,645 | 8/1972 | Temple et al. | 428/293 |
| 3,707,432 | 12/1972 | Corbin | 156/178 |
| 3,853,683 | 12/1977 | Stapleford et al. | 428/293 |
| 4,044,188 | 8/1977 | Segal | 428/285 |

Primary Examiner—James J. Bell
Attorney, Agent, or Firm—Whann & McManigal

[57] ABSTRACT

A fiberglass mat having high tear resistance which comprises a base or sheet made of chopped glass fibers, bonded together by a bonding agent. Randomly oriented, substantially continuous fiberglass strands may be embedded and bonded in the base, the strands being separated by layers of base material. The mat may also have one or more separate layers of longitudinal substantially continuous fiberglass strands, which may generally either be straight or sinusoidal, bonded into the base material.

18 Claims, 7 Drawing Figures

FIBERGLASS MAT

RELATED APPLICATIONS

This Application is a continuation-in-part of U.S. application Ser. No. 681,422, filed Apr. 29, 1976 now abandoned.

BACKGROUND OF THE INVENTION

The present invention relates to fiberglass mats which are usually provided in sheet form and may be marketed in a roll or formed into desired shapes. The fiberglass mats on the market today generally consist of a base of chopped glass fibers ranging in length from ¼" to 1¼" and diameters ranging between 9 and 16 microns. The chopped glass fibers are usually bonded together by a suitable bonding agent, such as urea resins, phenolic resins, bone glue, polyvinyl alcohols, etc. Preferably, the bonding agent is water resistant. The glass fibers and the bonding agent are usually formed into a mat having a production width of approximately 36" to 48". The mat is passed through an oven in order to cure the bonding agent. There are two generally accepted methods today for making fiberglass mat: the dry method and the wet method.

In the dry method, elongated yarn strands, which are usually continuous, are often placed in the center area of the mat or sheet to provide tear resistance. Such an arrangement, however, has the disadvantage of causing layering, i.e., a separation of the mat into a plurality of laminae or sheets. This is caused by the central layer of yarns weakening the mat in mechanical strength and destroying its homogeneity, thus causing or allowing easy separation of the mat into two or more parts.

An example of a mat formed by means of the dry process, and a machine for forming that mat, has been shown in U.S. Pat. No. 2,731,066 to Hogendobler, et al. Those patentees recognized that a mat consisting only of chopped fibers and a bonding agent resulted in a product with very little tear strength in any direction. Consequently, they proposed to install continuous strands of fiberglass in the product. They therefore proposed to develop a mat having reinforcing strands arranged in a haphazard pattern and, in addition, a plurality of parallel reinforcing strands. However, in that patent it is disclosed that the reinforcing strands of both types are randomly mixed, considered in vertical cross-section, into the resulting product, without providing for any separation between the different types of strands. In fact, in many instances either or both types of the reinforcing strands are positioned along, or extend to, one of the surfaces of the mat. Consequently, while those strands do provide additional strength, relative to a mat having only the chopped fiber bonded together, the resultant product is still insufficiently strong to withstand tearing under common usage.

In this country, for example, roofing materials are applied to new buildings at an extremely rapid rate. As a result, they must be able to withstand rather rough handling. In many instances, matting formed by the dry process and transformed into roofing materials, even using the Hogendobler reinforcing strands, is insufficiently strong to withstand the rough handling. This results from several reasons. One of the reasons is that dry chopped fiber does not disburse uniformally across the surface of the mat being produced, and thus the resultant product does not have uniform strength. Additionally, the reinforcing strands which are indiscriminately mixed throughout the thickness of the mat cause the resultant product to lack a proper homogeneity, with a resultant loss in tear resistance strength.

Consequently, it has been found that although the products formed in accordance with the Hogendobler disclosure are greatly improved over those which do not utilize reinforcing strands, they are still insufficiently strong to withstand rough handling and usage without making the mat so thick that the weight increase negates the original reason for using the reinforcing strands. In other words, since the randomyarn and straight yarns are not separated, the tear resistance strength, at least in some directions of tearing force application, is significantly reduced.

The wet process has been developed over the past few years in order to be able to produce fiberglass mat at a far more rapid rate than is available using the dry process. Initially, the process was developed to produce a product having only chopped fibers and bonding agent. Consequently, there was no significant tear strength in any direction for any suitable product. In many areas of the world, such as Europe, such mat is quite satisfactory for being transformed into roofing. Since construction proceeds at a more leisurely pace in those areas, the handling of roofing materials is far more gentle and not so much strength is needed in the product. In this country, however, roofing must be produced at about three times the rate as it is produced in Europe and the resulting products must be strong enough to withstand the rough handling required by speed in application.

Consequently, it has become very desirable to be able to produce a fiberglass mat by the wet process having strength which at least meets and preferably exceeds that available through the dry process, such as taught by Hogendobler, et al.

As a further problem discovered in the prior art products, it has been found that there are some instances in which it is highly undesirable to use reinforcing strands which are installed in a straight line along the length of the mat being produced. During the production of matting, the strands are drawn from the spools by some mechanism and applied to the location of initial mat formation. As these strands are drawn from the spools, there is a possibility that, occasionally, the strand will "hang-up" temporarily until it can be pulled free by continued application of a pulling force. Such a hang-up might be caused, for example, by a slight snag in the line which causes it to bind against an adjacent winding of the strand on the spool. When this occurs, tension can be imposed on the entire line up to the point at which curing has finally occurred in the oven. This is closely analogous to what happens to a fishing line when a fisherman raises the tip of his rod to impose tension on the line. In the production of fiberglass mat, this imposition of tension on the longitudinal strand, even momentarily, usually causes a disruption and disorientation of the chopped fibers. Such disruption may occur in the fibers both above and below the strand. The result is a line of weakening extending along the entire mat from the point of finished curing to the initial mat formation location. It is very difficult to discern this line of weakening caused by such "fishlining".

If the mat having the weakened section is transformed into roofing, for example, the disorientation of the chopped fibers usually results in a "ripcord" or straight line crack developing along the length of the product. That line of weakness which develops into a crack can then cause a crack to develop in all of the layers of roofing material formed on a roof, whether above or below the mat section containing the crack. In fact, such continuous cracking has sometimes occurred in such a manner that it appeared that a vandal had pushed a circular handsaw along the length of the roof.

Obviously, this is an extremely dangerous possibility since the premature destruction of roofing materials can result in severe damage to a building. In most cases, it is impossible to prevent the cracking since the "fishlining" cannot be seen since there is no visible disorientation of the straight line strand, considered in a horizontal cross-sectional plane, at least.

In some instances, it may also be desirable to provide a mat having other than absolutely straight reinforcing strands. Such a need might arise from a finished product requirement relating to bending. For example, if bending occurs along a straight strand, that strand presents a very narrow reinforcing bend area and it will serve as a "ripcord" and allow the product to crack and/or break. On the other hand, a semi-straight or sine wave-type of strand configuration will present a much wider reinforcement. Consequently, any bending which may occur is far less likely to result in damage to the product.

As a result, it has become imperative to produce a fiberglass mat having a significant strength to resist tearing, is not susceptible to "fishline" or "ripcord" damage, and which can be produced at a very high speed.

SUMMARY OF THE INVENTION

The present invention relates to a fiberglass mat which meets all of the requirements of the preceding paragraph and does not have any of the deficiencies described with respect to the prior art.

One substantial use for fiberglass mat which is high in tear resistance in any direction, is in the manufacture of asphalt roofing, in which the fiberglass mat is substituted for the asphalt impregnated felt sheet now in common use. Such roofing made from a fiberglass mat has many advantages: it is fireproof and superior in quality and performance, and it requires the use of less asphalt than the standard roofing, all resulting in substantial cost savings.

Another use for the mat of the present invention is in connection with carpeting and flooring and also in plywood reinforcing, where the mat in sheet form may be placed between layers of plywood. Other uses for the invention may be found in non-corrosive products, battery separator mats, electrical laminates, wood surfacing, and in many other industries.

It is an object of the present invention to provide a mat having high tear resistance in all directions. Further, it is preferred that the mat have adequate mechanical strength throughout its entire body of mixture of chopped glass and bonding agent so that the mat not only has a high tear resistance but also has high mechanical strength at the central portion so that layering, such as occurs in the prior art, is eliminated.

Mats formed in accordance with the present invention may include fiberglass strands, yarns, or slivers, embedded in the base of the mat in separate layers. Preferably, ample base material, such as chopped fibers and bonding agents, may be placed between the layers in order to provide mechanical strength in the central plane of the mat. At least some of the strands may be arranged in a randomly oriented pattern, with the strands being strong and highly resistant to tearing or severing. Thus, the mat may be provided with tear resistance, at least against forces imposed in a longitudinal direction relative to the mat.

Such mats may have such tear resistant strands installed in patterns which may be of a particular, desired size and shape. Such shapes might include, for example, a uniform circular pattern in which the circular portions join each other and are offset. Where such overlapping occurs, the portions of the yarn may be bonded together.

It is a further object of this invention to provide a mat of the type referred to in the preceding paragraphs in which there may be a separate layer of longitudinal strands of fiberglass embedded in the base, which layer gives extra strength to the mat to withstand tearing in a direction transverse to the major mat dimension. Such longitudinal strands may, in some applications at least, be substantially straight. This would be satisfactory, for example, when "ripcording" or "fishlining" will not create any significant problem in the product to be produced from the mat. Alternatively, however, the longitudinal strands can be laid into the mat in such a manner that they resemble a sine wave extending from one end of the mat to the other.

Such a sinusoidal configuration produces two advantages. Any "hanging-up" of the strand on the spool will result in the application of a tension force to the strand which will disorient the chopped fibers only through a very short length of the mat, such as a few inches. Further, such a disruption would be immediately evident to the naked eye because the relatively consistent sinusoidal pattern of the strand would suddenly be disrupted by a straight portion a few inches long. Of course, depending upon the severity of the "hang-up" it is quite possible that the chopped fibers might not even be disoriented at all. Further, the elimination of the straight reinforcing strand has proven to be a significant factor in the production of higher strength roofing shingles, for example. Those familiar with roofing shingles will realize that the exposed portion of the shingle is susceptible to repeated bending by the wind, at least until the bonding adhesive used to apply the shingle to a roof, becomes competely cured. A straight reinforcing strand in such a product may form a bend line or ripcord in the shingle which will result in a very rapid severing of the shingle along that natural bend line. Consequently, it can be seen that the sinusoidal configuration of the longitudinally oriented reinforcing strand can produce significant benefits over the substantially straight strand.

Upon reading the following detailed description, taken together with the accompanying drawings, those skilled in the art will realize that fiberglass mat according to the present invention may be constructed in a variety of elemental combinations, many of which may not even resemble those discussed here but which, nevertheless, will employ the present invention as defined in the claims.

DETAILED DESCRIPTION

For the purposes of this application, the term "vertical", as applied to the mat and its components, shall be considered to refer to mat thickness. On the other hand, "horizontal" shall refer to the length/width of the mat. Obviously, these terms do not define the orientation of the mat or any resulting product. Thus, FIG. 1 is a multi-planar horizontal sectional view and FIG. 3 is a vertical sectional view.

Figure 1:
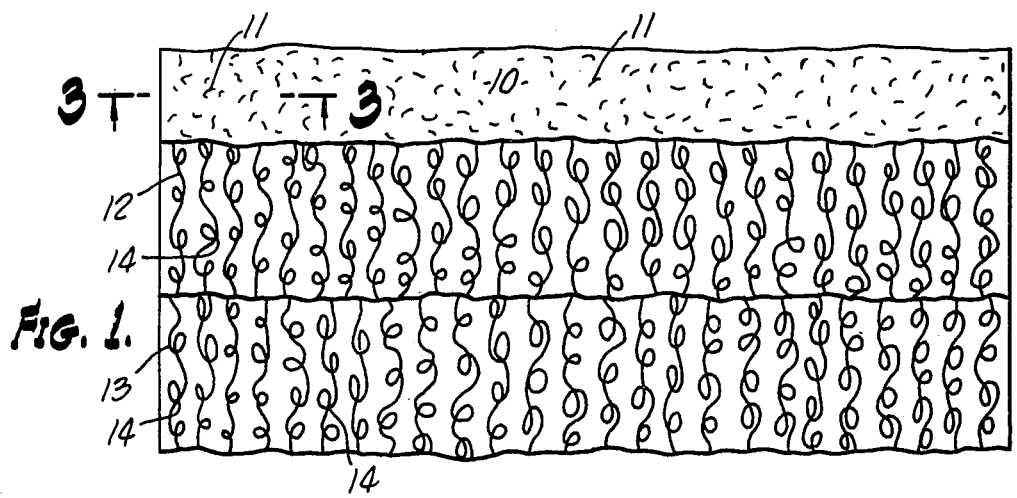
FIG. 1 is a plan view, partly in section in different vertical planes of a fiberglass mat employing randomly oriented fiberglass strands.
Figure 3:
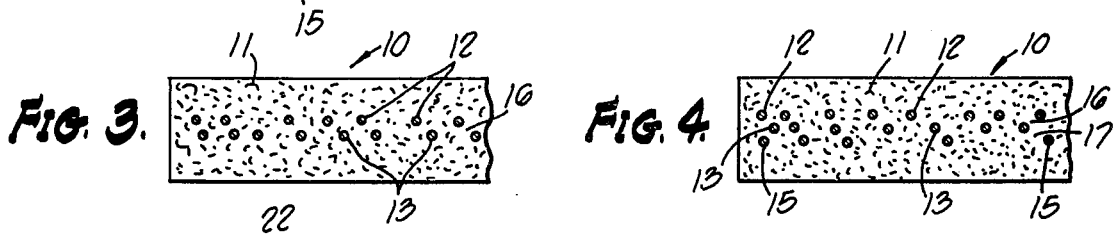
FIG. 3 is a cross-sectional view of the mat shown in FIG. 1, taken along the line 3—3 thereof.

As shown in FIGS. 1 and 3, there is a mat or sheet 10 comprising a base which may be formed of chopped glass fibers indicated by the numeral 11, and bonded together by a suitable bonding agent—many of which are presently known—which is preferably water resistant.

The chopped glass fibers may be of a substantially uniform or standard size and length, as well as of a glass composition normally used as the chopped glass fibers of any well known production process. The fibers may be of a suitable diameter, e.g., within the range of 9–16 microns. The fiber lengths may be within the present standards of ¼" to 1¼" long. However, these diameters and lengths are not considered to be critical and any desired dimensional relationship may be utilized.

Bonding agents which may be employed in forming the mat or base are such as are commonly found in the industry today. They would include, for example, urea resins, phenolic resins, bone glue, polyvinyl alcohol, polyvinyl acetates, and various coupling and stabilizing agents.

Randomly oriented glass textile strands, yarns, or slivers 12 and 13 may be positioned within the vertical limits of the mat base 10. Preferably, the strands may be laid in layers, such that each layer is within a horizontal plane intermediate and substantially parallel to the top and bottom surfaces of the mat, as shown in FIG. 3. Preferably, the layers or planes may be located near the central plane of the mat. As shown, the layers or planes comprising the strands 12 and 13 are two distinct, separate, and separated layers with a volume of the base or mat material of chopped glass and bonding agent located between the layers as indicated at 16.

Figure 2:
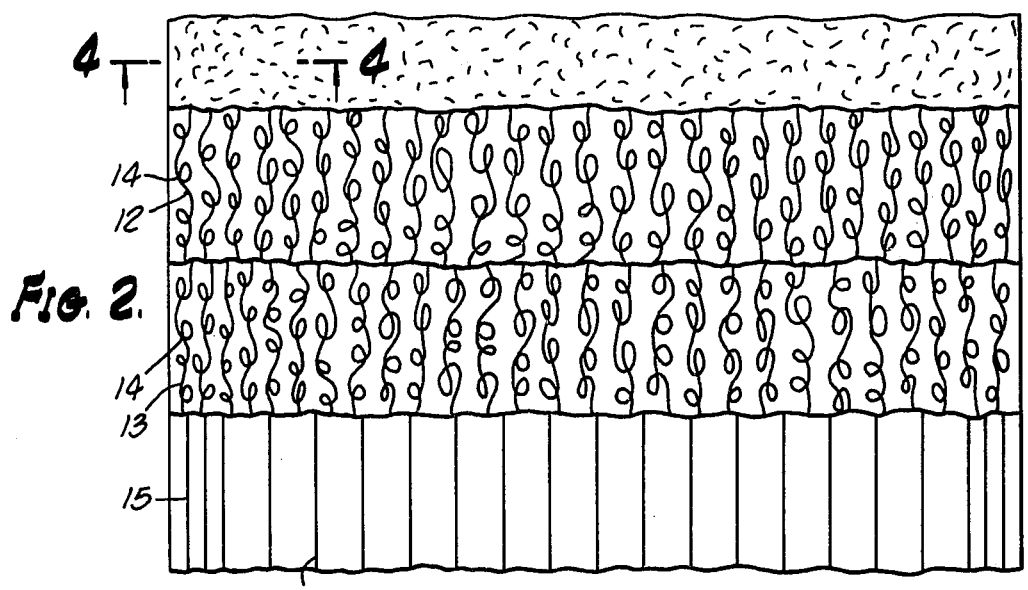
FIG. 2 is a view similar to FIG. 1, showing the use of straight longitudinal strands of fiberglass in combination with randomly oriented fiberglass strands.
Figure 5:
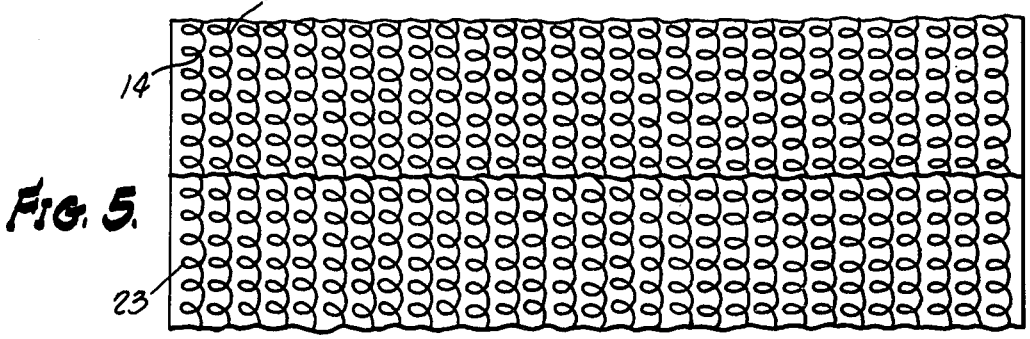
FIG. 5 is a plan view, partly in section, of tear resistant yarns arranged in a definite spiral or convoluted pattern.

With the layers of strands thus separated, and with the volume of mat material located between the layers, there is no weakening or plane of weakness in the central portion of the mat. The body of the mat will have adequate mechanical strength throughout and, because of the strengthening at the central plane of the mat, there will be no separation of the mat body into a plurality of parts, layers, or laminae. These yarns and slivers, or, as may be generally called, "strands of fiberglass", need not be arranged according to a particular pattern, but may be arranged at random in successive circular or oval portions of different sizes, radii, etc. The circular or oval portions may be offset from each other as shown in FIGS. 1, 2 and 5, but the circular or oval portions should preferably be within the same plane as the remainder of the strands. Whenever the strands 12 and 13 of the separate layers cross-over themselves, forming the circular or oval portions, they may be bonded together at those points by the bonding agent. Such bonding crossover points have been indicated at 14 in FIGS. 1 and 2. Preferably, the strands 12 and 13 extend throughout substantially the entire length and width of the mat so that no significant portion of the mat is devoid of these randomly oriented strands.

Figure 4:
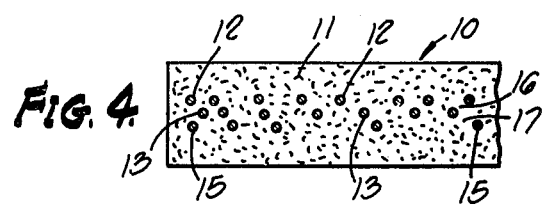
FIG. 4 is a cross-sectional view of the mat shown in FIG. 2, taken along a line 4—4 thereof.

In FIGS. 2 and 4, the invention has been illustrated as utilizing longitudinal strands of fiberglass which may be substantially parallel and are identified by the numeral 15. The longitudinal strands may be located within their own distinct and separate plane and that plane is preferably separated from the planes which include the random yarn layers 12 and 13.

In this embodiment of the invention, the longitudinal strands 15 may be substantially straight and the layer of strands 15 may be separated from the layer 13 by a volume of mat material 17 in order to give adequate mechanical strength to the mat body. Thus, as shown in FIGS. 2 and 4, the longitudinal strands 15 may be located below the remaining strand layers. Of course, those skilled in the art will realize that the longitudinal strand layers could be located intermediate the layers of strands 12 and 13. If, through a tearing action, a strand is torn loose and would tend to be pulled from the mat, which is highly unlikely, it will be stopped because of the presence of the randomly oriented strands 12 and 13 at the first bonding point 14 and thus prevent pulling loose of the entire strand.

In this form of the invention, the mat is preferably 36" to 48" wide, and three parallel strands along each edge of the mat may be ⅜ths of an inch apart, and the other parallel strands may be 2 inches apart, plus or minus ½ inch. The randomly oriented strands may be spaced on center lines about ⅜ths of an inch apart. By putting the strands in three separated layers or planes, the tear strength of the mat is enhanced because of the plurality of bearing surfaces. Since the strands are at different horizontal planar levels between the top and the bottom of the mat, a far superior resistance is available to forces which would tend to tear the mat in a direction across its width, e.g., from left to right in the figures, than is possible when a single layer of yarn is provided. This is also true relative to a mat in which the reinforcing strands are haphazardly or randomly oriented relative to the top and bottom of the mat.

In a final product which may be formed in accordance with this invention, there may be approximately 70% chopped fiberglass, 10% strands 12, 13 and 15, and 20% bonding agent. Of course, the invention is not limited to these percentages and they may be changed as desired. For example, it may be desirable in some forms of the invention to have more than 10% of the reinforcing strands. Likewise, it may be desirable to have the mat or base 10 thicker, in which case the percentage of bonding agent would be more than 70% and 20%, respectively.

FIG. 5 is a plan sectional view of this invention in which the strands of fiberglass 22 and 23 form a definite pattern of spiral portions or convolutions, offset from each other but connected together. In this form of the invention, like the prior forms, the strands 22 and 23 may be in two separate layers. Also, the layers of strands 22 and 23 may be distributed over the entire area so that each portion of the mat or base is tear resistant in all directions.

Figure 6:
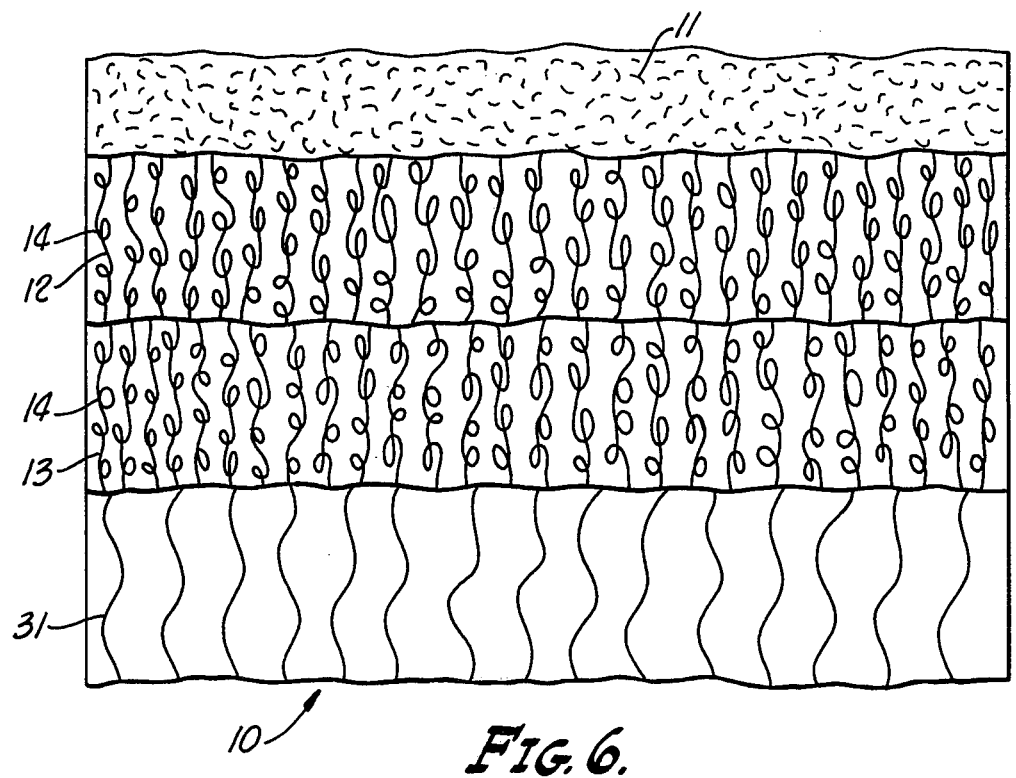
FIG. 6 comprises a view of an alternate embodiment of the present invention, similar to FIG. 2, in which the longitudinal strands are laid in a generally sinusoidal orientation.
Figure 7:
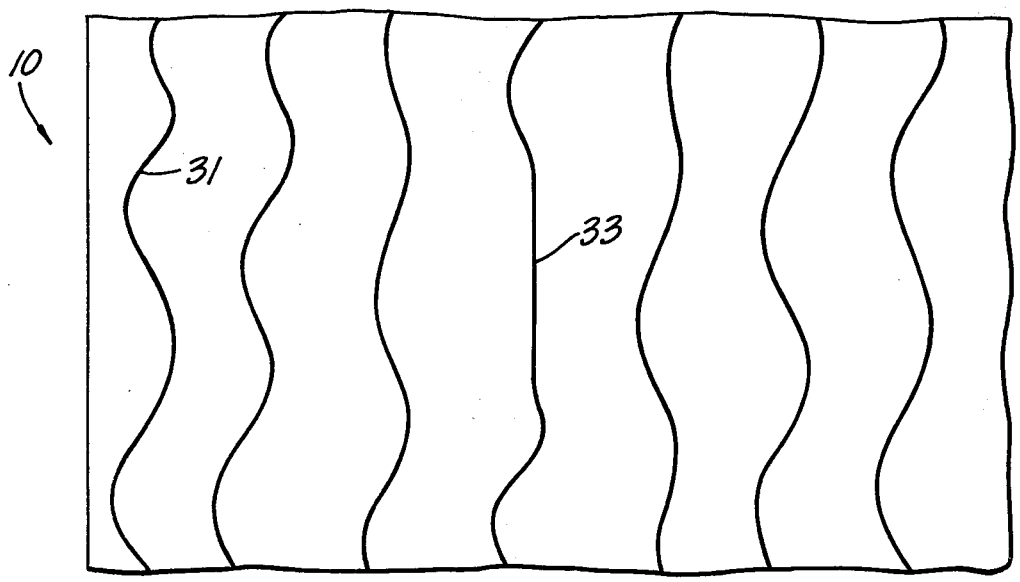
FIG. 7 comprises a plan view of a mat formed in accordance with the alternate embodiment of this invention, illustrating only the longitudinal strands.

In the embodiment of the invention illustrated in FIGS. 6 and 7, those structural elements which are substantially identical to those in the above-described embodiments have been provided with similar reference numerals so that no further description thereof is necessary. As shown in FIG. 6, the straight longitudinal strands 15 depicted in FIGS. 2 and 4 have been replaced by longitudinal strands 31, such as are depicted in FIGS. 6 and 7. Broadly speaking, the strands 31 are somewhat longer than is necessary to form a straight longitudinal strand, such as that at 15. This is accomplished to set up the wavy pattern depicted which, for the sake of convenience, shall hereinafter be referred to as "sinusoidal". Those skilled in the art will realize, of course, that the longitudinal strands 31 could be employed without the random strands 12 and 13, with only one of the layers of random strands 12 and 13, or in a position intermediate the random strands 12 and 13. In any event, the strands 31 are preferably within a single horizontal plane intermediate the upper and lower surfaces of the base 10.

It has been found that the semi-straight or sinusoidal longitudinal strands are advantageous for several reasons. Referring to FIG. 2, it can be seen that any of the strands 15 cover only a very narrow area and any bending of the mat along the line parallel to the strands 15 will tend to use one of those strands as a bending line. Consequently, any bending forces in that direction are applied over a very narrow area, resulting in a relatively early failure of the product. For example, the substantially parallel strands 15 act as a ripcord at the junction of the main body of a finished shingle and its exposed edge portion. When the shingle is exposed to wind, the wind will bend it back-and-forth about the straight strand until the exposed edge is eventually sealed down to the roof by its self-sealing adhesive. This problem often occurs in products using absolutely parallel yarns and such shingle failure often occurs during Fall and Winter in northern climates since the adhesive does not have sufficient time to bond in the lower ambient temperatures and high winds.

On the other hand, if bending should occur along a line generally parallel to the longitudinal strands 31, any bend line which might be formed is several hundred times wider than that which would be possible with the embodiment of FIG. 2. This eliminates the possibility of a ripcord effect, since there is so much more material to resist the bending and the ripcording.

This alternate embodiment also has additional advantage when "fishlining" occurs as the result of a hang-up in the strand material as it leaves the spool. When an absolutely straight or parallel strand "hangs up", i.e., stops running momentarily for any number of reasons, it will disorient the chopped fibers located above and below it for some substantial length within the mat. This disorientation is not readily apparent and can later cause the mat product to crack or break apart along that line for a number of feet. This failure often does not show up until the mat is within the finished product and is located, for example, on a roof. Obviously, such a failure can be extremely costly since, at least, a large portion of the roofing material will have to be replaced.

On the other hand, when the semi-straight or sinusoidal strands hang-up or stop running momentarily, any major defect in the mat which might be caused by fishlining, such as is shown at 33 in FIG. 7, can be easily detected by the naked eye. As a result, the defective portion of the mat can be cut away to eliminate the possibility of hidden defects getting into a finished product.

Partly as the result of the use of sinusoidal reinforcing strands, and partly as the result of the distinct separation of the different reinforcing strand configurations into separate planes located between the top and bottom of the mat, products formed in accordance with the present invention have been found to be much stronger than those formed in accordance with the Hogendobler, et al. disclosure described previously. In fact, recent testing of products produced according to these two processes over an extended period of time has disclosed that products formed in accordance with the present invention are far stronger than those formed in accordance with the Hogendobler disclosure. By way of example, the following table sets forth the results of certain testing conducted upon the two types of mat products. A brief review of that table will indicate to those skilled in the art that mats formed in accordance with the alternate embodiment of the present invention are significantly stronger than those formed in accordance with the Hogendobler, et al. disclosure:

| Mat | Hogendobler, et al. Mat Product | Alternate Embodiment Mat Product |
|---|---|---|
| Weight | 1.85 lbs. per 100 ft.$^2$ | 1.85 lbs. per 100 ft.$^2$ |
| Elmendorf Tear Resistance | 266 grams | 466 grams |
| Tensile Strength: | | |
| Machine Direction | 58 lbs. per 3" width section | 75+ lbs. per 3" width section |
| Cross Machine Direction | 45 lbs. per 3" width section | 72.4 lbs. per 3" width section |

Having now reviewed the preceding detailed description, those skilled in the art will be aware of the fact that mats formed in accordance with the present invention may be produced so as to have a variety of configurations, many of which may not even resemble that depicted in the drawings but which, nevertheless, will utilize reinforcing strands in distinct planes and configurations such as have been disclosed here. Those embodiments will, nevertheless, utilize the spirit and teaching of the invention, as found in the following claims.

I claim:
1. A fiberglass mat comprising
a base formed by a wet process and having dispersed glass fibers bonded together by a bonding agent, said base having
a top surface and
a bottom surface,
at least one distinct and separated layer of randomly oriented fiberglass strands within said base and located within a predetermined first plane intermediate said top surface and said bottom surface, and
at least one distinct and separated layer of substantially longitudinally oriented fiberglass strands within said base and located within a predetermined second plane intermediate said top surface and said bottom surface, said first and second planes being substantially parallel to one another and separated by glass fibers and bonding agent in said base.

2. The mat of claim 1 including
a second distinct and separated layer of randomly oriented fiberglass strands within said base and located within a predetermined third plane intermediate said top and bottom surfaces, said third plane being substantially parallel to said first and second planes and separated therefrom by glass fibers and bonding agent in said base.

3. The mat of claim 1 wherein
said substantially longitudinally oriented fiberglass strands in said layer deviate from a straight line in sinusoidal fashion.

4. The mat of claim 3 wherein the deviation from a straight line of said strands is not less than ± ¼ inch and not greater than ± ¾ inch.

5. A fiberglass mat comprising
a base formed of substantially uniformly dispersed glass fibers bonded together by a bonding agent, said base having
a top surface, and a bottom surface, and
a plurality of layers of randomly oriented fiberglass strands within said base and bonded thereto in distinct planes intermediate and generally parallel to said top and bottom surfaces, said distinct planes being separated from one another by glass fibers and bonding agent, said strands within each of said planes being bonded to said base and randomly bonded to one another and to themselves at longitudinally spaced locations.

6. The mat of claim 5 including
a layer of distinct and separated, substantially longitudinally oriented, fiberglass strands within and bonded to said base and located within a predetermined plane intermediate said top and bottom surfaces and separated from the planes of each of said plurality of layers.

7. The mat of claim 6 wherein
said longitudinally oriented strands are sinusoidal in longitudinal configuration within their plane.

8. A fiberglass mat comprising
a base formed of substantially uniformly dispersed glass fibers bonded together by a bonding agent; and
a plurality of separate layers of strands embedded in said base, bonded therein, and surrounded thereby, there being a volume of mat material formed of glass fibers bonded together by a bonding agent positioned between said separate layers, at least one of said layers comprising randomly oriented fiberglass strands and at least one of said layers comprising longitudinal strands of fiberglass.

9. The mat of claim 8 wherein said longitudinal strands deviate from straight lines by not less than ± ¼ inch on an average and by not more than ± ¾ inch on an average.

10. A fiberglass mat comprising
a base formed of substantially uniformly dispersed glass fibers bonded together by a bonding agent; and
a plurality of separate layers of strands embedded in said base and bonded therein and surrounded thereby, there being a volume of mat material formed of glass fibers bonded together by a bonding agent positioned between said separate layers.

11. The mat of claim 10 wherein
one of said separate layers of strands comprises randomly oriented strands extending within a single horizontal plane in said mat.

12. The mat of claim 11 wherein
another of said separate layers of strands comprises longitudinally oriented strands, none of said latter strands being in contact with any of said randomly oriented strands throughout the length of said mat.

13. The mat of claim 11 wherein
another of said separate layers of strands comprises substantially sinusoidally oriented strands, none of said latter strands being in contact with any of said randomly oriented strands throughout the length of said mat.

14. The mat of claim 13 wherein said sinusoidally oriented strands deviate from straight lines by not less than ± ¼ inch.

15. The mat of claim 13 wherein said sinusoidally oriented strands deviate from straight lines by not more than ± ¾ inch.

16. The mat of claim 13 having the following average characteristics:

| | |
|---|---|
| Weight per 100 square feet | 1.85 pounds |
| Elmendorf Tear Resistance | 466 grams |
| Tensile Strength | |
| Machine Direction | at least 75 pounds per 3 inch width |
| Cross Machine Direction | 72.4 pounds per 3 inch width |

17. A fiberglass mat comprising
a base formed of glass fibers bonded together by a bonding agent; and
a plurality of separate layers of randomly oriented fiberglass strands embedded in said base and bonded therein and surrounded thereby, there being a volume of mat material formed of glass fibers bonded together by said bonding agent positioned between the layers of strands, thus providing mechanical strength at the intermediate portion of said mat between said layers of strands.

18. A fiberglass mat comprising
a base formed of glass fibers bonded together by a bonding agent, said mat having a central horizontal plane; and
at least two horizontal layers of fiberglass strands embedded in said base and bonded thereto, said separate layers being positioned near said central plane with ample base material between said layers to provide mechanical stength at the central part of said mat, said strands being highly resistant of tearing or severing, and providing tear-resistance in all directions throughout the mat.

* * * * *